United States Patent [19]

Yokoi et al.

[11] Patent Number: 5,861,435
[45] Date of Patent: Jan. 19, 1999

[54] METHOD FOR PREVENTING SETTLEMENT OF AQUATIC FOULING ORGANISMS

[75] Inventors: Junji Yokoi, Ikoma; Isao Nakamura, Uji; Ryoji Hamade, Kadoma; Naoki Yamamori, Tsuzuki-gun; Hiroharu Ohsugi, Hirakata; Akio Harada, Nara, all of Japan

[73] Assignee: Nippon Paint Co., Ltd., Osaka-Fu, Japan

[21] Appl. No.: 530,405

[22] Filed: Sep. 15, 1995

[30] Foreign Application Priority Data

| Sep. 16, 1994 | [JP] | Japan | 6-222002 |
| Sep. 16, 1994 | [JP] | Japan | 6-222025 |
| Sep. 16, 1994 | [JP] | Japan | 6-222029 |
| Sep. 16, 1994 | [JP] | Japan | 6-222030 |
| Sep. 16, 1994 | [JP] | Japan | 6-222033 |
| Oct. 25, 1994 | [JP] | Japan | 6-260098 |

[51] Int. Cl.⁶ .......... A01N 27/00; A01N 29/00; A01N 33/00; A01N 33/26
[52] U.S. Cl. .......... 514/570; 514/54; 514/63; 514/150; 514/519; 514/520; 514/521; 514/522; 514/523; 514/524; 514/525; 514/532; 514/533; 514/534; 514/535; 514/538; 514/539; 514/540; 514/543; 514/544; 514/546; 514/547; 514/548; 514/549; 514/550; 514/551; 514/552; 514/557; 514/558
[58] Field of Search .......... 424/78.09, 78.37, 424/78.38; 514/570, 54, 63, 150, 519–525, 532–535, 538–540, 543–544, 546–552, 557–561, 564, 567, 568, 571, 613, 617–622, 638, 639, 641, 646, 649, 653, 675, 676, 678, 699, 701, 715–717, 730, 764, 918

[56] References Cited

FOREIGN PATENT DOCUMENTS

| 0 186 146 A2 | 7/1986 | European Pat. Off. |
| 2 384 010 | 10/1978 | France . |
| 5665860 | 6/1981 | Japan . |
| 3251506 | 11/1991 | Japan . |
| 4128205 | 4/1992 | Japan . |

OTHER PUBLICATIONS

Patent Abstracts of Japan, vol. 8 No. 246 (C–251) (Nov. 10, 1984) & JP–A–59 124957 (Mitsubishi Acetate KK) (Jul. 19, 1984) (abstract).

Chemical Abstracts, vol. 90, No. 2 (1979) Columbus, Ohio, US; abstract No. 7684t, Kase Kiyoshi 'Paint for Prevention of Adhering of Oyster on Ships', p. 72, col. 1 (abstract) & JP–A–78 102 340 (Nichiyo Ryokka Kaihatsu) (Sep. 6, 1978).

Database WPIL No. 93–042 649, Derwent Publications Ltd., London, Dec. 22, 1992, JP 4–370 174 (Nippon Oils & Fats Co. Ltd.), abstract.

Database WPIL No. 93–042648, Derwent Publications Ltd., London, Dec. 22, 1992, JP 4–370 173 (Nippon Oils & Fats Co. Ltd.), abstract.

Chemical Abstracts 116 : 123298Z (1992).

Chemical Abstracts 117: 85277C (1992).

WPIDS Abstracts Accession No. 81–52723D (1981), abstracting JP 56–65860 (1981).

Japio Abstract Accession No. 92–128205 (1992), abstracting JP 4–128205 (Apr. 28, 1992).

Japio Abstract Accession No. 88–072611 (1988), abstracting JP 63–072611 (Apr. 2, 1988).

Primary Examiner—John Pak
Attorney, Agent, or Firm—Wenderoth, Lind & Ponack, LLP

[57] ABSTRACT

A method for preventing settlement of aquatic fouling organisms on surface of an aquatic structure without environmental hazard is provided. The method is based upon absolutely novel concept to prevent the settlement by means of thick slime layer, i.e. bio-jelly, deposited on said surface. The present invention also provides a bio-jelly producing agent and a bio-jelly producing paint both useful for the present method. Further, the present invention provides a novel low toxic antifouling agent.

9 Claims, No Drawings

METHOD FOR PREVENTING SETTLEMENT OF AQUATIC FOULING ORGANISMS

ART FIELD

The present invention relates to a method for preventing settlement of aquatic fouling organisms on surface of aquatic structures, such as ships or bridges. More particularly, the present invention relates to an absolutely novel method to prevent it by means of bio-jelly produced on the said surface. The present invention also relates to a bio-jelly producing agent useful for the said method and a bio-jelly producing paint containing the same. The present invention also relates to a novel low toxic antifouling agent.

PRIOR ART

When aquatic organisms, such as barnacles, tubeworms, tunicates, bryozoa, oyster, tubeworms and algae settle on outer surface of a ship bottom, total weight of the ship and hydraulic resistance are increased and causes to slow down cruising speed. It lead industrial problems including shortening of life and increasing of fuel requirement. Many method for preventing settlement of such organisms has been investigated, for example, biological method such as using natural enemy; a method with a material having property of not to be settled such as copper alloy, and silicone or fluoride paint; preventing infiltration of larva with screen; killing the larva by means of, such as, lighting, ultraviolet lighting, coloring, sonication, increasing of temperature and limiting oxygen; remove of settled organisms by means of mechanical force, such as washing, washing by jet flow, brushing and vacuuming; and chemical or biochemical method such as methods using shellfish killing agent, repellent agent and antifouling agent.

Recently, an antifouling paint containing an antifouling agent becomes popular because it can be easily applied for wide range, having high efficiency and easy for treating. The antifouling paint is designed so that the antifouling agent is emitted from the paint film into environmental water gradually or the paint film is abraded during the use in order to expose the newly developed surface successively. It is pointed out that such antifouling paint may be an environmental hazards. Particularly, tin compound, most popular antifouling agent, had been founded to be toxic against marine products in 1980's, and European and U.S. government began to regulate the use of tin containing antifouling paint. Development of a novel method for preventing settlement of aquatic organisms instead of using tin compound is highly desirable. However, no method has been developed except for using a relatively low toxic antifouling agent and many people in the art have been studying for low toxic agent instead for the tin compound.

SUMMARY OF THE INVENTION

It is an object of the present invention to provide a novel method for preventing settlement of aquatic fouling organisms on surface of an aquatic structure without environmental hazard. The present invention provides the method basically without biocidal antifouling agent. Accordingly, the present invention provides a method for preventing settlement of visible size aquatic fouling organisms on surface of an aquatic structure, comprising of a step to produce bio-jelly on the said surface.

On surface of an aquatic structure, such as outer wall of a ship bottom, a thin slime layer having slimy texture is adhered. Conventionally the slime layer has been thought in the art that should be removed as foulant. However, we have now made an unexpected discovery that slime layer thickly deposited on aquatic surface, i.e. bio-jelly, is useful for preventing settlement of aquatic fouling organisms on the surface. Until now, there has not been any concept to grow up and utilize the slime layer for preventing settlement of aquatic organisms such as barnacles, algae, oyster, tubeworms, mussels. The inventors founded that providing of a relatively thick slime layer, e.g. a bio-jelly, on surface of an aquatic structure is effective to prevent the settlement.

In the present method, bio-jelly may be produced on surface of a structure by applying a bio-jelly producing agent on the surface. Accordingly, another object of the present invention is to provide bio-jelly producing agents which are useful for the present method. One of the bio-jelly producing agents of the present invention comprising of a compound of the formula:

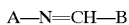

wherein A and B are organic moieties having 3–26 carbon atoms respectively.

Preferable compound is a benzylidene aniline derivative of the formula I:

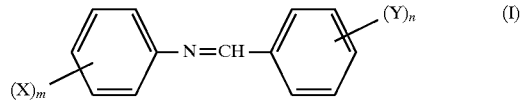

wherein n and m are integers of 0–5 respectively; X may be same or different and is selected from the group consisting of halogen, hydrocarbon or alkoxyl having 1–20 carbon atoms, nitro, amino, hydroxyl, carboxyl, ester, cyano, azo and azomehine; Y may be same or different and is selected from the group consisting of halogen, hydrocarbon or alkoxyl having 1–20 carbon atoms, nitro, amino, hydroxyl, carboxyl, ester, cyano, azo and azomehine.

Especially useful benzylideneaniline derivatives include the compound of following formula II:

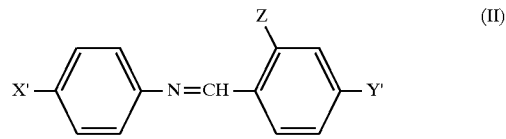

wherein, X' is selected from the group consisting of hydrogen, halogen, hydroxyl and nitro; Y' is selected from the group consisting of hydrogen, chloro and methyl; and Z is selected from the group consisting of hydrogen and hydroxyl; in which at least two of X', Y' and Z are simultaneously hydrogen atoms.

The present invention also provides a bio-jelly producing agent comprising of a compound having a styryl or cinnamoyl group of the formula III:

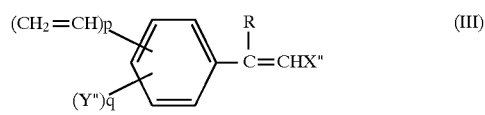

wherein X" is selected from the group consisting of hydrogen, carboxyl, hydroxymethyl, aldehyde, carbonyl and amide; when X" is carboxyl, it may be an ester or a salt thereof; Y" is selected from the group consisting of halogen, alkyl, halogenated alkyl, alkoxy, carboxyl, ester, cyano, azo, azomethine, amino, alkoxysilyl and alkoxysilyl alkyl; R is selected from the group consisting of hydrogen, alkyl and halogen; q is an integer of 0–2, p is an integer of 0 or 1.

Another object of the present invention to provide a bio-jelly producing paint composition useful for the present method. Accordingly, the present invention provides a bio-jelly producing paint composition comprising of the bio-jelly producing agent of the present invention and a binder.

Yet another object of the present invention is to provide a low toxic antifouling agent in place of conventional tin composition, and an antifouling paint containing the same. Accordingly, the present invention provides an antifouling agent comprising of a compound of the formula IV:

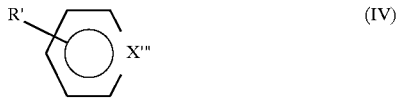

wherein X''' is selected from the group consisting of nitrogen and C—Y'''; wherein Y''' is selected from the group consisting of $NH_2$, $NO_2$, $SO_3H$, CHO and COOH; R' is selected from the group consisting of hydrocarbon and alkoxy having 1–20 carbon atoms, but when Y''' is $NH_2$, $NO_2$, or CHO, R may be hydrogen. The present invention also provides an antifouling paint comprising the same and a binder.

Definitions

In the present specification, the term "aquatic fouling organisms" means attached organisms which settle on surface of structures in aquatic atmosphere and lead industrial and economical disadvantage. Individuals of which grow up to visible size. They include animals, for example barnacles, mussels, hydroid, bryoza, tuunicates and tubeworms, and plants, for example algae.

The term "aquatic structure" includes ship bottom, fishnet, race pipe, bridge, sea structures and the like.

The term "slime layer" means a thin layer of slimy texture consisting of metabolites of a variety of aquatic organisms, and deposited on surface of an aquatic structure.

The term "bio-jelly" means slime layer having a thickness of equal to or more than about 0.3 mm. The term "bio-jelly producing agent" means an agent comprising of a compound having an ability to promote deposition of the slime and to produce bio-jelly on surface of an aquatic structure.

The term "bio-jelly producing paint composition" means a paint composition for aquatic structure having an ability to promote deposition of the slime and to produce bio-jelly on surface of an aquatic structure.

The term "antifouling agent" means an biocidal agent for preventing settlement of the aquatic fouling organisms.

The term "antifouling paint" means a paint for aquatic structure having an biocidal activity to prevent settlement of the aquatic fouling organisms.

DETAILED DESCRIPTION

The present invention provides a method for preventing settlement of aquatic fouling organisms on surface of an aquatic structure comprising of a step to produce a thick slime layer, i.e. bio-jelly, on said surface. According to the present method, thickness of the slime layer is preferably equal to or more than about 0.3 mm, more preferably about 0.5–6 mm, and still more preferably, about 1–5 mm. In the present specification, slime layer having thickness of greater than about 0.3 mm is called as bio-jelly. In the present specification, the thickness of slime layer or bio-jelly is measured with a scale after the plate to be measured is out from water and leave it for one hour at room temperature. The slime layer or bio-jelly is composed essentially from metabolites of aquatic organisms, especially that of aquatic microorganisms. Some organisms, such as bacteria and diatoms, can inhabit in the layer and are actually observed there.

As a chemical material, the layer contains a variety of saccharide, polysaccharide, lipids, glycoproteins and phospholipid. According to the present method, preferred bio-jelly contains a number of polysaccharide. The preferred polysaccharide are composed from one or more neutral monosaccharide including rhamnose, mannose, arabinose, glucose and the like. More preferably, at least 60% by weight of the polysaccharide are composed from such neutral monosaccharide.

According to the present method, bio-jelly can be produced on surface of an aquatic structure by means of a paint containing a kind of compound. Such a compound useful for the present method includes 1,8-cineole, benzylidene aniline derivatives and compounds having styrene or cinnamoyl group. When one or more such compounds are applied on surface of an structure and put it into aquatic atmosphere, deposition of slime layer on the surface is promoted and it becomes thick bio-jelly soon. In the present specification, such a compound is called as bio-jelly producing agent.

A bio-jelly producing agent of the present invention including a compound of the formula:

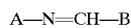

wherein A and B are organic moieties having 3–26 carbon atoms respectively.

Preferable compound is a benzylidene aniline derivative of the formula I:

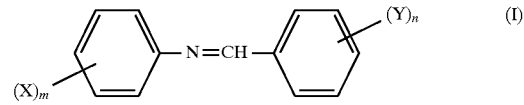

wherein n and m are integers of 0–5 respectively, X may be the same or different and is selected from the group consisting of halogen, hydrocarbon or alkoxy having 1–20 carbon atoms, nitro, amino, hydroxyl, carboxyl, ester, cyano, azo and azomethine; Y may be the same or different and is selected from the group consisting of halogen, hydrocarbon or alkoxy having 1–20 carbon atoms, nitro, amino, hydroxyl, carboxyl, ester, cyano, azo and azomethine.

Preferably, n and m are 0 or 1 respectively. X is preferably a halogen, such as chloro or bromo; a hydrocarbon, especially a saturated or unsaturated aliphatic hydrocarbon having 1–18 carbon atoms which may or may not have a side chain, for example ethyl, isopropyl, n-propyl, t-butyl, hexyl, octyl, 2-ethylhexyl, nonyl, decyl, lauryl, stearyl and oleyl; an alkoxy, especially saturated or unsaturated an alkoxy group having 1–18 carbon atoms, for example ethoxy, butoxy, hexyloxy, octoxy, nonyloxy, stearyloxy, benzyloxy and naphtyloxy; hydroxy; and nitro.

Examples of preferable bio-jelly producing agent of the present invention include 4'-ethylbenzylidene-4-ethyl aniline, 2'-isopropylbenzylidene-4-butoxyaniline, 4-nonyl benzylideneaniline, 4'-stearylbenzylidene-4-butoxyaniline, benzylidene-4-nonyloxyaniline, 4'-ethylbenzylidene-4-hexylaniline, 4'-ethoxybenzylidene-4-n-octylaniline, 2'-butoxybenzylidene-2-ethylaniline, 4'-naphthyloxy benzylidene aniline, 4'-ethylbenzylidene-4-nitroaniline, 3',4'-diethylbenzylidene-4-butylaniline, terephthalidene-di-4-butoxyaniline, di-4-butoxybenzylidene-p-phenylenediamine, benzylidene-4-n-octylaniline, 4'-nonylbenzylidene-4-methoxyaniline, 4'-ethylhexylbenzylideneaniline, 4',4-oleyloxybenzylideneaniline, 2'-ethoxy-4'-bromobenzylideneaniline, 4'-hexylbenzylidene-4-octoxyaniline, 4'-nonyloxybenzylidene-4-nonylaniline, 4'-nonylbenzylidene-2-butoxyaniline, benzylideneoctylamine, butylideneaniline, octylidene-4-hexylaniline, octylidene-4-octylaniline, cinnamilidene-aniline and cinnamilideneoctylamine.

Especially useful benzylideneaniline derivative includes a compound of the following formula II:

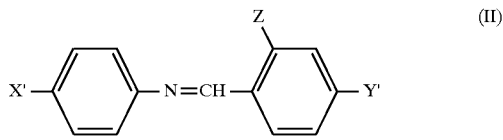

wherein, X' is selected from the group consisting of hydrogen, halogen, hydroxyl and nitro; Y' is selected from the group consisting of hydrogen, chloro and methyl; and Z is selected from the group consisting of hydrogen and hydroxyl; in which at least two of X', Y' and Z are simultaneously hydrogen atoms.

In the above compounds of the formula II, especially preferable bio-jelly producing agents include benzylidene aniline, benzylidene-4-chloroaniline, benzylidene-4-bromoaniline, benzylidene-4-nitroaniline, benzylidene-4-hydroxyaniline, 4'-methylbenzylideneaniline, 4'-chloro benzylideneaniline and 2'-hydroxybenzylideneaniline.

The bio-jelly producing agents of the present invention also includes a compound having a styryl or cinnamoyl group of the formula III:

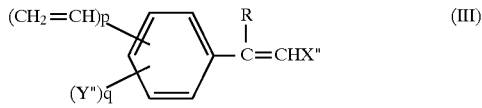

wherein, X" is selected from the group consisting of hydrogen, carboxyl, hydroxymethyl, aldehyde, carbonyl and amide; when X" is carboxyl, it may be an ester or salt thereof; Y" is selected from the group consisting of halogen, alkyl, halogenated alkyl, nitro, alkoxy, carboxyl, ester, cyano, azo, azomethine, amino, alkoxysilyl and alkoxysilylalkyl; R is selected from the group consisting of hydrogen, alkyl and halogen; q is an integer of 0–2, p is an integer of 0 or 1.

The compounds defined as above formula III can be divided into two categories, one of which is a styrene derivative wherein x" is hydrogen, the other is a cinnamoyl derivative wherein X" is a carboxyl (cinnamic acid), a hydroxymethyl (cinnamic alcohol), an aldehyde (cinnamic aldehyde) or an amide (cinnamic amide).

The aromatic ring of the compound or the carbon atom bonded directly to the aromatic ring may have a substituting group. The aromatic group may have an unsaturated ethylenic substituent, such as vinyl to provide for example divinyl benzene (p=1). It may have another substituent (Y") which may be the same as above. When q is 0, Y" represents hydrogen. The number of substituent Y" is preferably equal to or less than 2. When Y" is a halogen, it may be any one of F, Cl, Br and I, however, Cl or Br is preferable. When Y" is an alkyl, it may be saturated or unsaturated, branched or unbranched an alkyl, a cycloalkyl or an aralkyl having 1–18, preferably 1–12, more preferably 1–10 carbon atoms. Higher number of carbon atoms or substituents is not preferable since molecular weight per styryl or cinnamoyl group (equivalence) is too high. The alkyl group may be substituted by a halogen. Another examples of Y" include nitro, cyano, azomethine, azo, alkoxy and alkoxysilyl. When Y" is an alkoxy or an alkoxysilyl, an alkoxy having 1–2 carbon atoms is preferable. The alkoxysilyl may be an alkoxysilylalkyl, and the alkyl moiety has preferably 1–2 carbon atoms. The substituent Y" may be a reactive group, for example, hydroxyl, carboxyl, amino, ammonium, sulfonate, phosphonium and sulfonium, and in case of carboxyl group, it may be an organic or inorganic salt, or an ester thereof. The onium or carboxyl group is important for controlling characteristics of the bio-jelly producing agent including ion property, compatibility with another additives of the paint into which the agent is incorporated and affinity with the base resin of the paint in order to control the quality of the paint composition to meet the condition of surrounding water and required emission. As well as the onium or carboxyl group, when Y" is an alkyl, an alkoxyl or an ester, the length of the alkyl moiety or the ester residue is important for controlling affinity, lipophilic character and compatibility of the bio-jelly producing agent in order to control emission or releasing character of the paint composition.

R is selected from the group consisting of hydrogen, alkyl, phenyl, halogen and the like, and typically, is hydrogen. When R is an alkyl, it may be a cycloalkyl or an aralkyl having 1–18, preferably 1–9, and more preferably 1–3 carbon atoms, and typically is methyl or ethyl. When it is a halogen, it may be chloro or bromo. The number of the substituent(s) is equal to or less than 2, and preferably 0 or 1. P is 0 or 1, especially 0.

The molecular weight of the compound having a styryl or cinnamoyl group used in the present invention is about 100–800, preferably is 100–600. When the molecular weight is higher than 800, thickness of slime layer is decreased and bio-jelly formation may be insufficiently. In addition, not only molecular weight, but also styryl equivalent or cinnamoyl equivalent is preferably about 100–600.

When the bio-jelly producing agent of the present invention is a cinnamic acid derivative, it may be an ester or a salt. Especially, the cinnamic acid ester is efficient for deposition of bio-jelly. The preferable ester is an ester with branched or unbranched alcohol having 1–18, more preferably 1–12, especially 1–10 carbon atoms.

The salt may be either organic or inorganic. Examples of inorganic salt include salt of alkaline metal such as Na and K, alkali earth metal such as Ca and Mg, ammonium, Mn, Zr(O), Al, Zn and Fe. Examples of organic salt include salt of amins, alkanol amins, polyamines and N-heterocyclic compounds such as imidazoline.

The bio-jelly producing agents of the present invention are commercially available or may be synthesized according to conventional process.

The bio-jelly producing agent of the present invention may be incorporated into an appropriate paint composition and apply the same on surface of an aquatic structure. Unlike tin compounds, the bio-jelly producing agent of the present invention does not become environmental hazard, therefore it may be used as a paint composition for fish net by dissolving or suspending it into an appropriate solvent and if necessary, adding an appropriate polymer.

The present invention also provides a bio-jelly producing paint composition comprising the above defined bio-jelly producing agent and binder resin.

A binder resin suitable for the paint composition of the present invention has glass transition temperature (Tg) of 15°–120° C., more preferably of 25°–100° C., number-average molecular weight of 1000–50000, more preferably of 5000–30000, and hydroxyl number of 0–100 mg KOH/g, more preferably of 0–80 mg KOH/g. The above range of Tg contributes to strength and abrading characteristics of the paint film which is also preferable as conventional antifouling paint.

When the Tg is lower than 15° C., the paint film becomes too soft to keep itself from peeling into water during cruising of the ship. When the Tg is greater than 120° C., some cracks may spread on the paint film.

When the number-average molecular weight is lower than 1000, desired strength of the film cannot be obtained. When it is greater than 50,000, viscosity of the paint will be higher and excess solvent will be required in order to keep a definite viscosity.

When the hydroxyl number is greater than 100, sea water may invade inside of the paint film and too much amount of bio-jelly producing agent may be released into the water, and therefore, antifouling activity cannot be kept for enough term.

Examples of the binder resin which can be used in the present invention include acrylic, polyester, alkyd, vinyl, epoxy, urethan and urea resins.

The bio-jelly producing paint composition of the present invention may contain the bio-jelly producing agent preferably 15–75%, more preferably 20–60% by weight of solid component of the composition. The composition also contains the binder resin preferably 20–70%, more preferably 30–60% by total weight of the composition.

In addition to the bio-jelly producing agent and binder resin, the paint composition of the present invention may comprise another ingredients including appropriate diluent, for example water, alcohol, alkyl glycol, cellosolve, acetate ester, xylene, toluene or ketone, extender pigment for example talc, coloring pigment and hardening agent. Further, the composition of the present invention may be added an amount of known antifoulant, pesticide or herbicide within the range which do not inhibit produce of bio-jelly.

The paint composition of the present invention may be applied on a structure by any one of the methods known in the art, for example painting, soaking or spraying.

The bio-jelly produced on a structure are peeled gradually by mechanical forth due to such as wave or cruising of the ship, and new bio-jelly is then produced. To facilitate the reproducing of the bio-jelly, it is preferred that the paint film itself are abraded gradually due to cruising or wave and new paint surface are revealed successively. On this newly revealed paint surface, deposition of bio-jelly is better than the old one and thick layer of bio-jelly may be obtained again within a short time.

Such an abrading character of the paint composition is estimated by degree of film consumption. In the present specification, the degree of film consumption is determined as follows. Test composition is applied on an acrylic resin disk and dried overnight at room temperature so that the thickness of the dried film is around 200 μm. Initiation paint film thickness ($d_0$) of the dried disk was determined exactly with a roughness meter. The painted disk is rotated in sea at the peripheral speed of 30 knot for one month, then, the thickness of the paint film ($d_1$) was determined with the roughness meter. The difference between the $d_0$ and $d_1$ (i.e. $d_1-d_0$) was determined as degree of film consumption. The bio-jelly producing paint showing the degree of film consumption of 2–40 μm is useful for the present invention.

Yet another object of the present invention is to provide a low toxic novel antifouling agent which can take place of tin compound and an antifouling paint composition comprising the same. Accordingly, the present invention provides a antifouling agent comprising of a compound of the formula [IV]:

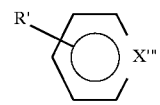

In the formula [IV], X''' is nitrogen (N) or C—Y''', wherein Y''' is $NH_2$, $SO_3H$, CHO or COOH. That is, when X''' is nitrogen, IV represents pyridine ring, when Y''' is $NH_2$, IV represents aniline ring, Y''' is $NO_2$, it represents nitrobenzene ring, Y''' is $SO_3H$, it represents benzenslufonic acid ring, Y''' is CHO, it represents benzaldehyde ring, and Y''' is COOH, it represents benzoic acid ring.

R' is selected from the group consisting of hydrocarbon having 1–20 carbon atoms, such as branched or unbranched alkyl group including methyl, ethyl, hexyl, octyl, nonyl, decyl, undecyl, dodecyl and stearyl; cycloalkyl such as cyclobutyl, cyclopentyl, cyclohexyl, cycloheptyl, cyclooctyl and cyclododecyl; alkenyl such as propenyl, butenyl, hexenyl, octenyl and dodesenyl; and aryl such as phenyl, tryl, xylyl, and naphthyl; and alkoxy having 1–20 carbon atoms such as ethoxy, nonyloxy, oleyl. Among the substituents, a hydrocarbon and an alkoxy both having 6–12 carbon atoms are preferable for antifouling ability and controlling emission.

The substituent R' may be at ortho- or para-, preferably para- position to the X''' in the formula of [IV].

When the formula IV represents an aniline, nitrobenzene, or benzaldehyde ring, R' may be a hydrogen atom since the unsubstituted compounds were shown to be also effective for settlement prevention and appropriate emission into sea water. Except for the aniline, nitrobenzene and benzaldehyde derivatives, a compound of IV wherein R' is hydrogen atom is difficult to be used as antifouling agent since its emission is too much to keep desired durability.

R' may be a halogen atom such as fluorine, chloro or bromo.

Examples for the compound of IV include 2-methyl pyridine, 4-ethylpyridine, 4-hexylpyridine, 4-octylpyridine, 4-nonylpyridine, 4-decylpyridine, 4-laurylpyridine, aniline, 4-ethylaniline, 4-hexylaniline, 4-octylaniline, 4-nonylaniline, 4-decylaniline, 4-dodecylaniline, 4-ethylnitrobenzene, 4-octyl benzenesulfonic acid, 4-ethylbenzenesulfonic acid, 4-hexylnitrobenzene, 4-octylbenzaldehyde, 4-nonylbenzaldehyde, 4-ethylbenzenesulfonic acid, 2-octylbenzoic acid, 4-hexyloxy aniline, 4-nonyloxypyridine, 4-hexyl-2-chloro aniline, 4-ethoxy-2-chloroaniline, 4-nonyloxyaniline, 4-decylbenzoic acid, 4-oleylaniline and 4-stearylaniline.

Among the above compounds, 4-hexylpyridine, 4-octyl pyridine, 4-nonylpyridine, 4-decylpyridine, 4-laurylpyridine, 4-hexylaniline, 4-octylaniline, 4-nonylaniline, 4-decylaniline, 4-dodecylaniline, 4-octylbenzenesulfonic acid, 4-hexylnitrobenzene, 4-octylbenzaldehyde, 4-nonylbenzaldehyde, 2-octylbenzoic acid, 4-hexyloxyaniline, 4-nonyloxypyridine, 4-hexyl-2-chloroaniline, 4-nonyloxyaniline and 4-decylbenzoic acid are preferable.

The compounds of the formula IV are commercially available or may be synthesized according to conventional process.

When the compound of the formula IV has a carboxyl or sulfonic acid moiety, it may be a salt thereof. Examples of salt include salt of alkaline metal such as Na and K, alkali earth metal such as Ca and Mg, ammonium, Mn, Zr(O), Al, Zn and Fe.

When the compound has an aniline or pyridine ring, it may be a hydrochloride salt.

As an antifouling agent of the present invention, one or more compound of the formula IV may be used as they are. However, in general, a paint film into which the compound of the formula IV is dispersed may be obtained by dispersing the said compound into solution of the resin and a solvent, applying the same on the surface of a structure and drying the same.

An effective amount of the compound of formula IV is 3–70%, more preferably, 5–50% by total weight of the solid component of the paint composition. When the amount is less than 3% by weight, desired antifouling effect cannot be obtained. When the amount is greater than 70% by weight, paint film formation is inhibited and enough strength cannot be obtained.

In particular, the antifouling agent of the present invention can be used as an antifouling paint by adding into an appropriate paint composition for a surface of an aquatic structure.

That is, the compound of the formula IV may be used to prepare antifouling paint composition by dissolving or dispersing into an appropriate solvent and if desired, adding a binder resin and may be applied on, for example, ship bottom or as a paint for fish net.

Examples for binder resin which is preferred to use with the antifouling agent of the invention is the same as above mentioned binders. The amount of the compound of formula IV may be 3–70%, more preferably 5–50% by total weight of solid components of the paint.

The antifouling paint of the present invention, in addition to the antifouling agent and the binder, may contain appropriate diluent, such as water, alcohol, alkyl glycol, cellosolve, acetate, xylene, toluene and ketone; loading agent such as talc; coloring agent and curing agent.

In addition, the antifouling paint of the present invention may contain known antibiotics, pesticides or herbicides within the range which do not affect the antifouling activity of the compound of formula [IV].

The antifouling paint of the present invention may be applied on surface of an aquatic structure by any known method including painting, soaking and spraying.

To further illustrate this invention, and not by way of limitation, the following examples are given.

EXAMPLES

Example 1

A bio-jelly producing paint composition was prepared by mixing 20 g of butyral resin, 25 g of xylene, 5 g of n-butanol and 15 g of bio-jelly producing agent, 1,8-cineole homogeneously. The paint was applied on surface of an acrylic plate (300 mm×100 mm×2 mm) and dried so that the thickness of the paint film is about 200 $\mu$m. The plate was soaked into sea at the temperature of 12°–18° C. After 2 weeks, 1, 2, 4, and 8 months, thickness of slime layer (bio-jelly) deposited and amount of aquatic fouling organisms settled on the surfaceof the plate was determined. The results are shown in table 1.

Comparative Example 1

A paint composition similar to example 1 with the exception of using 7 g of tributyltinoxide (TBTO), a conventional tin antifoulant, instead of 1,8-cineole was prepared and determined its properties according to the procedure of example 1. The results are shown in table 1.

Comparative Example 2

A paint composition was prepared by dissolving 20 g of butyral resin into 40 g of xylene. The properties of the paint were determined according to the procedure of example 1. The results are shown in table 1.

Comparative Example 3

The same acrylic plate used in example 1 was soaked into sea at the temperature of 12°–18° C. After 2 weeks, 1, 2, 4, and 8 months, thickness of slime layer (bio-jelly) deposited and amount of aquatic fouling organisms settled on the surface of the plate was determined. The results are shown in table 1.

TABLE 1

| SETTLEMENT PREVENTION | | | | | |
|---|---|---|---|---|---|
| | 2 weeks | 1 month | 2 months | 4 months | 8 months |
| Example 1 | 1/0 | 2/0 | 2/0 | 3/0 | 2/0 |
| Comparative Example 1 | <0.1/0 | <0.1/0 | <0.1/0 | <0.1/0 | <0.1/0 |
| Comparative Example 2 | <0.1/5 | <0.1/15 | <0.1/100 | <0.1/100 | <0.1/100 |
| Comparative Example 3 | <0.1/5 | <0.1/10 | <0.1/70 | <0.1/100 | <0.1/100 | thickness of slime layer (bio-jelly) (mm)/settlement of fouling organisms (area %)

Determination of sugar component of bio-jelly.

Bio-jelly or slime layer obtained in example 1 or comparative example 2 was removed and filtrated, and then purified by recrystallization with methanol. One hundred twenty mg of the each purified samples was putted into a tube and one ml aliquot of 4M trifluoroacetic acid was added. The tube was sealed under reduced pressure, and the sample was hydrolysed for 6 hours at 100° C. Resulted product was dried under vacuo and dissolved into 1 ml of water. The solution was injected into HPLC and the peak area and retention time were compared with that of standard sample to determine and quantify the sugar. The result is shown in table 2.

TABLE 2

| saccharide components of bio-jelly (wt %) | | | | |
|---|---|---|---|---|
| | Example 1 | | Comparative Example 2 | |
| monosaccharide | 2 weeks | 2 months | 2 weeks | 2 months |
| rhamnose | 20.5 | 17.9 | 10.2 | 8.1 |
| ribose | 1.6 | 2.7 | 3.8 | 3.2 |
| mannose | 8.1 | 11.8 | 4.2 | 3.6 |
| fructose | 4.0 | 3.1 | 4.5 | 7.2 |
| arabinose | 5.7 | 5.7 | 36.9 | 42.8 |
| galactose | 4.8 | 10.8 | 3.2 | 2.2 |
| xylose | 0.6 | 0.9 | 10.2 | 16.3 |
| glucose | 57.9 | 47.1 | 27.0 | 16.6 |

Example 2 (antibiotic activity)

(1) Preparation of medium:

Two percent solution of the determination disk medium (kyokuto kabushiki kaisha) in water was sterile at 120 ° C. for 30 minute. Into five parts by weight of the solution, one part by weight of culture of mixed bacteria comprising of *Bacillus sp.*, *Vibrio sp.*, and *Salmonella sp.* in bouillon medium was added, and the mixture was poured into a sterile petri dish to prepare an agar plate.

(2) Preparation of paper disk:

1,8-cineole, a bio-jelly producing agent was used as a test compound. The test compound was dissolved in acetone. A paper disk of 7 mm diameter (TOYO ROSHI, #53) was immersed into the solution to absorb 25 mg of the test compound.

(3) The paper disk obtained in (2) was dried and putted on the agar plate of (1), and incubated the plate for 5 days at 30° C. Then, diameter of inhibition zone formed around the paper disk was determined and antibiotic activity of the bio-jelly producing agent was evaluated. The result is shown in table 3.

Comparative example 4

With the exception of immersing the disk into acetone without test compound, example 2 was repeated and evaluated the background activity. The result is shown in table 3.

Comparative example 5

An antibiotic activity of TBTO was evaluated according to the procedure of example 2. The result is shown in table 3.

of the bio-jelly producing agent was prepared, and determined its properties according to the procedure of example 1. The results are shown in table 4.

Comparative example 7

A paint composition similar to example 3 with the exception of using 15 g of cuprous antifouling agent, i.e. cuprousoxide and 5 g of rosin instead of bio-jelly producing agent was prepared, and determined its properties according to the procedure of example 1. The results are shown in table 4.

Comparative example 8

A paint composition similar to example 3 except for not containing any bio-jelly producing agent were prepared, and determined its properties according to the procedure of example 1. The results are shown in table 4.

TABLE 4

| | bio-jelly producing agent | settlement prevention | | | |
|---|---|---|---|---|---|
| | | 2 weeks | 1 month | 2 months | 4 months |
| Ex. 3 | 4'-ethylhexylbenzylideneaniline | 2/0 | 2/0 | 2/0 | 3/0 |
| Ex. 4 | 4',4-oleyloxybenzylideneaniline | 2/0 | 3/0 | 2/0 | 2/0 |
| Ex. 5 | 2'-ethoxy-4'-bromobenzylideneaniline | 1/0 | 2/0 | 3/0 | 3/0 |
| Ex. 6 | 4'-ethoxybenzylidene-4-n-octylaniline | 2/0 | 2/0 | 2/0 | 3/0 |
| Ex. 7 | 2'-butoxybenzylidene-2-ethylaniline | 2/0 | 2/0 | 2/0 | 2/0 |
| Ex. 8 | 4'-naphthyloxybenzylideneaniline | 2/0 | 2/0 | 3/0 | 4/0 |
| Ex. 9 | 4'-ethylbenzylidene-4-nitroaniline | 1/0 | 2/0 | 3/0 | 3/0 |
| Ex. 10 | 3',4'-diethylbenzylidene-4-butylaniline | 2/0 | 2/0 | 2/0 | 3/0 |
| Ex. 11 | telephtalidene-di-4-butoxyaniline | 2/0 | 3/0 | 3/0 | 3/0 |
| Ex. 12 | di-4-butoxybenzylidene-p-phenylenediamine | 2/0 | 2/0 | 2/0 | 3/0 |
| Ex. 13 | benzylidene-4-n-octylaniline | 2/0 | 3/0 | 3/0 | 2/0 |
| Ex. 14 | 4'-nonylbenzylidene-4-methoxyaniline | 2/0 | 3/0 | 2/0 | 3/0 |
| Ex. 15 | 4'-ethylbenzylidene-4-ethylaniline | 2/0 | 3/0 | 2/0 | 4/0 |
| Ex. 16 | 2'-isopropylbenzylidene-4-butoxyaniline | 2/0 | 3/0 | 3/0 | 3/0 |
| Ex. 17 | 4-nonylbenzylideneaniline | 2/0 | 2/0 | 2/0 | 4/0 |
| Ex. 18 | 4'-stearylbenzylidene-4-butoxyaniline | 2/0 | 2/0 | 3/0 | 2/0 |
| Ex. 19 | benzylidene-4-nonyloxyaniline | 2/0 | 2/0 | 3/0 | 3/0 |
| Ex. 20 | 4'-ethylbenzylidene-4-hexylaniline | 2/0 | 2/0 | 3/0 | 3/0 |
| Ex. 21 | benzylideneoctylamine | 1/0 | 2/0 | 2/0 | 3/0 |
| Ex. 22 | butylidene aniline | 1/0 | 2/0 | 2/0 | 2/0 |
| Ex. 23 | octylidene-4-hexylaniline | 1/0 | 1/0 | 1/0 | 2/0 |
| Ex. 24 | octylidene-4-octylaniline | 1/0 | 1/0 | 2/0 | 2/0 |
| Ex. 25 | cinnamilideneaniline | 2/0 | 2/0 | 3/0 | 3/0 |
| Ex. 26 | cinnamilideneoctylaniline | 1/0 | 1/0 | 2/0 | 2/0 |
| Comp. Ex. 6 (TBTO) | | <0.1/0 | <0.1/0 | <0.1/0 | <0.1/0 |
| Comp. Ex. 7 (cuprous oxide) | | <0.1/0 | <0.1/0 | <0.1/0 | <0.1/0 |
| Comp. Ex. 8 (control) | | <0.1/5 | <0.1/15 | <0.1/100 | <0.1/100 | thickness of slime layer(bio-jelly) (mm)/settlement of fouling organisms (area %)

TABLE 3

ANTIBIOTIC TEST

| sample | Control (disk) | 1,8-cineol | TBTO |
|---|---|---|---|
| diameter of inhibition zone (mm) | 7 | 7 | 15 |

Examples 3–26

A bio-jelly producing paint composition was prepared by mixing 20 g of butyral resin, 25 g of xylene, 5 g of n-butanol and 15 g of respective bio-jelly producing agents listed in table 4. The properties of the composition were determined according to the procedure of example 1. The results are shown in table 4.

Comparative example 6

A paint composition similar to example 3 with the exception of using 7 g of tin antifouling agent, i.e. TBTO instead Examples 27–44 (antibiotic activity)

An antibiotic activity of the compound listed in table 5 was evaluated according to the procedure of example 2. The results are shown in table 5.

Comparative example 9

An antibiotic activity of cuprous oxide was evaluated according to the procedure of example 2. The result is shown in table 5.

TABLE 5

| | bio-jelly producing agent | inhibition zone (mm) |
|---|---|---|
| Ex. 27 | 4'-ethylhexylbenzylideneaniline | 7 |
| Ex. 28 | 4',4-oleyloxybenzylideneaniline | 7 |
| Ex. 29 | 2'-ethoxy-4'-bromobenzylideneaniline | 7 |
| Ex. 30 | 4'-ethoxybenzylidene-4-n-octylaniline | 7 |
| Ex. 31 | 2'-butoxybenzylidene-2-ethylaniline | 7 |
| Ex. 32 | 4'-naphthyloxybenzylideneaniline | 7 |
| Ex. 33 | 4'-ethylbenzylidene-4-nitroaniline | 7 |

TABLE 5-continued

| | bio-jelly producing agent | inhibition zone (mm) |
|---|---|---|
| Ex. 34 | 3',4'-diethylbenzylidene-4-butylaniline | 7 |
| Ex. 35 | telephtalidene-di-4-butoxyaniline | 7 |
| Ex. 36 | di-4-butoxybenzylidene-p-phenylenediamine | 7 |
| Ex. 37 | benzylidene-4-n-octylaniline | 7 |
| Ex. 38 | 4'-nonylbenzylidene-4-methoxyaniline | 7 |
| Ex. 39 | 4'-ethylbenzylidene-4-ethylaniline | 7 |
| Ex. 40 | 2'-isopropylbenzylidene-4-butoxyaniline | 7 |
| Ex. 41 | 4'-nonylbenzylideneaniline | 7 |
| Ex. 42 | 4'-stearylbenzylidene-4-butoxyaniline | 7 |
| Ex. 43 | benzylidene-4-nonyloxyaniline | |
| Ex. 44 | 4'-ethylbenzylidene-4-hexylaniline | 7 |
| Comp. Ex. 9 ($Cu_2O$) | | 12 |

Examples 45–52

A bio-jelly producing paint composition was prepared by mixing 20 g of butyral resin, 25 g of xylene, 5 g of n-butanol and 15 g of respective bio-jelly producing agent listed in table 6 homogeneously. The properties of the compound were determined according to the procedure of example 1. The results are shown in table 6.

Comparative example 10

A paint composition similar to example 45 with the exception of using TBTO instead of the bio-jelly producing agent. The properties of the compound were determined according to the procedure of example 1. The results are shown in table 6.

Comparative example 11

A paint composition similar to example 45 with the exception of using 15 g of cuprous oxide and 5 g of rosin instead of the bio-jelly producing agent. The properties of the compound were determined according to the procedure ofexample 1. The results are shown in table 6.

Comparative example 12

A paint composition was prepared by mixing 20 g of butyral resin, 15 g of xylene and 5 g of butanol. The properties of the paint were determined according to the procedure of example 1. The results are shown in table 6.

Comparative example 13

A paint composition was prepared by dissolving 20 g of butyral resin into 40 g of xylene. The properties of the paint were determined according to the procedure of example 1. The results are shown in table 6.

Examples 53–60 (antibiotic activity)

Antibiotic activity of the compound listed in table 7 was determined according to the procedure of example 2. The results are shown in table 7.

Comparative example 15

With the exception of immersing the disk into acetone without test compound, example 2 was repeated and evaluated background activity. The result is shown in table 7.

Comparative example 16

Antibiotic activity of TBTO was determined according to the procedure of example 2. The result is shown in table 7.

Comparative example 17

Antibiotic activity of cuprous oxide was determined according to the procedure of example 2. The result is shown in table 7.

TABLE 7

| | bio-jelly producing agent | inhibition zone (mm) |
|---|---|---|
| Ex. 53 | benzylideneaniline | 7 |
| Ex. 54 | benzylidene-4-chloroaniline | 7 |
| Ex. 55 | benzylidene-4-bromoaniline | 7 |
| Ex. 56 | benzylidene-4-nitroaniline | 7 |
| Ex. 57 | benzylidene-4-hydroxyaniline | 7 |
| Ex. 58 | 4'-methylbenzylideneaniline | 7 |
| Ex. 59 | 4'-chlorobenzylideneaniline | 7 |
| Ex. 60 | 2'-hydroxybenzylideneaniline | 7 |
| Comp. Ex. 15 (control (disk)) | | 7 |
| Comp. Ex. 16 (TBTO) | | 15 |
| Comp. Ex. 17 ($Cu_2O$) | | 12 |

Examples 61–88

A Bio-jelly producing paint composition was prepared by mixing 20 g of butyral resin, 15 g of methylethyl ketone and 15 g of respective bio-jelly producing agents listed in table 8 homogeneously and determined its properties according to the procedure of example 1. The results are shown in table 8.

Comparative example 18

A paint composition similar to example 61 with the exception of using 7 g of TBTO instead of the bio-jelly producing agent was prepared and determined its properties according to the procedure of example 1. The results are shown in table 8.

Comparative example 19

A paint composition similar to example 61 with the exception of using 15 g of cuprous oxide and 2 g of rosin

TABLE 6

| | | settlement prevention | | | | |
|---|---|---|---|---|---|---|
| | bio-jelly producing agent | 2 weeks | 1 month | 2 months | 4 months | 8 months |
| Ex. 45 | benzylideneaniline | 2/0 | 2/0 | 3/0 | 3/0 | 3/0 |
| Ex. 46 | benzylidene-4-chloroaniline | 2/0 | 2/0 | 3/0 | 3/0 | 3/0 |
| Ex. 47 | benzylidene-4-bromoaniline | 2/0 | 2/0 | 3/0 | 3/0 | 3/0 |
| Ex. 48 | benzylidene-4-nitroaniline | 2/0 | 2/0 | 3/0 | 3/0 | 3/0 |
| Ex. 49 | benzylidene-4-hydroxyaniline | 1/0 | 2/0 | 2/0 | 2/0 | 2/0 |
| Ex. 50 | 4'-methylbenzylideneaniline | 1/0 | 2/0 | 2/0 | 2/0 | 2/0 |
| Ex. 51 | 4'-chlorobenzylideneaniline | 1/0 | 1/0 | 2/0 | 2/0 | 2/0 |
| Ex. 52 | 2'-hydroxybenzylideneaniline | 1/0 | 2/0 | 2/0 | 2/0 | 2/0 |
| Comp. Ex. 10 (TBTO) | | <0.1/0 | <0.1/0 | <0.1/0 | <0.1/0 | <0.1/0 |
| Comp. Ex. 11 ($Cu_2O$) | | <0.1/0 | <0.1/0 | <0.1/0 | <0.1/0 | <0.1/0 |
| Comp. Ex. 12 | | <0.1/5 | <0.1/15 | <0.1/100 | <0.1/100 | <0.1/100 |
| Comp. Ex. 13 | | <0.1/0 | <0.1/5 | <0.1/30 | <0.1/100 | <0.1/100 |
| Comp. Ex. 14 (acrylic plate) | | <0.1/5 | <0.1/10 | <0.1/70 | <0.1/100 | <0.1/100 | thickness of slime layer(bio-jelly) (mm)/settlement of fouling organisms (area %)

instead of the bio-jelly producing agent was prepared and determined its properties according to the procedure of example 1. The results are shown in table 8.

Comparative example 20

A paint composition was prepared by dissolving 20 g of butyral resin into 15 g of methylethylketone. The properties of the paint were determined according to the procedure of example 1. The results are shown in table 8.

Comparative example 21–24

A paint composition similar to example 61 with the exception of using xylene, ethylbenzene, vinylcyclohexane and ethylcyclohexane instead of the bio-jelly producing cinnamoyl compound was prepared and determined its properties according to the procedure of example 1. The results are shown in table 8.

Comparative example 25

A glass plate having same size as the acrylic plates of above examples was soaked as is into sea at the temperature of 12°–18° C. After 2 weeks, 1, 2, 4 and 8 months, thickness of slime layer deposited and amount of fouling organisms settled on the surface of the plate was determined. The results are shown in table 8.

Comparative example 26

An acrylic plate same as above examples was soaked as is into sea at the temperature of 12°–18° C. After 2 weeks, 1, 2, 4 and 8 months, thickness of slime layer deposited and amount of fouling organisms settled on the surface of the plate was determined. The results are shown in table 8.

Examples 89–106 (antibiotic activity)

An antibiotic activity of a compound listed in table 9 was evaluated according to example 2. The results are shown in table 9.

Comparative example 27

An antibiotic activity of TBTO was evaluated according to example 2. The result is shown in table 9.

Comparative example 28

An antibiotic activity of cuprous oxide was evaluated according to example 2. The result is shown in table 9.

Comparative example 29–32

An antibiotic activity of xylene, ethylbenzene, vinylcyclohexane or ethylcyclohexane was evaluated according to the procedure of example 2. The results are shown in table 9.

Comparative example 33

With the exception of immersing the disk into acetone without test compound, example 2 was repeated and evaluated background activity. The result is shown in table 9.

TABLE 9

| | bio-jelly producing agent | inhibition zone (mm) |
|---|---|---|
| Ex. 89 | cinnamic acid | 7 |
| Ex. 90 | methylcinnamate | 7 |

TABLE 8

| | bio-jelly producing agent | settlement prevention | | | | |
|---|---|---|---|---|---|---|
| | | 2 weeks | 1 month | 2 months | 4 months | 8 months |
| Ex. 61 | cinnamic acid | 2/0 | 2/0 | 2/0 | 3/0 | 4/0 |
| Ex. 62 | methylcinnamate | 2/0 | 2/0 | 2/0 | 3/0 | 4/0 |
| Ex. 63 | ethylcinnamate | 1/0 | 2/0 | 3/0 | 3/0 | 3/0 |
| Ex. 64 | butylcinnamate | 2/0 | 2/0 | 2/0 | 3/0 | 3/0 |
| Ex. 65 | n-propylcinnamate | 2/0 | 2/0 | 2/0 | 2/0 | 3/0 |
| Ex. 66 | i-propylcinnamate | 2/0 | 2/0 | 2/0 | 3/0 | 4/0 |
| Ex. 67 | hexylcinnamate | 2/0 | 2/0 | 2/0 | 3/0 | 3/0 |
| Ex. 68 | 2-ethylhexylcinnamate | 2/0 | 2/0 | 2/0 | 3/0 | 3/0 |
| Ex. 69 | n-octylcinnamate | 2/0 | 2/0 | 3/0 | 4/0 | 2/0 |
| Ex. 70 | nonylcinnamate | 1/0 | 2/0 | 3/0 | 3/0 | 3/0 |
| Ex. 71 | laurylcinnamate | 2/0 | 2/0 | 2/0 | 3/0 | 2/0 |
| Ex. 72 | styrene | 2/0 | 4/0 | 4/0 | 2/0 | 3/0 |
| Ex. 73 | divinylbenzene | 1/0 | 2/0 | 3/0 | 3/0 | 3/0 |
| Ex. 74 | cinnamic alcohol | 2/0 | 2/0 | 3/0 | 4/0 | 3/0 |
| Ex. 75 | cinnamic aldehyde | 2/0 | 2/0 | 3/0 | 3/0 | 3/0 |
| Ex. 76 | α-methylstyrene | 2/0 | 2/0 | 3/0 | 4/0 | 3/0 |
| Ex. 77 | chlorostyrene | 2/0 | 2/0 | 3/0 | 4/0 | 3/0 |
| Ex. 78 | chloroethylstyrene | 2/0 | 2/0 | 3/0 | 4/0 | 3/0 |
| Ex. 79 | trimethoxysilylstyrene | 2/0 | 2/0 | 3/0 | 3/0 | 5/0 |
| Ex. 80 | triethoxysilylstyrene | 2/0 | 2/0 | 3/0 | 4/0 | 4/0 |
| Ex. 81 | p-vinylaniline | 2/0 | 2/0 | 2/0 | 2/0 | 3/0 |
| Ex. 82 | p-hydroxymethylcinnamate | 2/0 | 2/0 | 2/0 | 3/0 | 2/0 |
| Ex. 83 | p-aminoethylcinnamate | 1/0 | 1/0 | 2/0 | 2/0 | 3/0 |
| Ex. 84 | p-cianostylene | 1/0 | 1/0 | 2/0 | 2/0 | 2/0 |
| Ex. 85 | calciumcinnamate | 1/0 | 2/0 | 2/0 | 2/0 | 3/0 |
| Ex. 86 | magneciumcinnamate | 1/0 | 1/0 | 1/0 | 2/0 | 2/0 |
| Ex. 87 | sodiumcinnamate | 1/0 | 1/0 | 2/0 | 2/0 | 3/0 |
| Ex. 88 | alminiumcinnamate | 1/0 | 2/0 | 2/0 | 2/0 | 2/0 |
| Comp. Ex. 18 (TBTO) | | <0.1/0 | <0.1/0 | <0.1/0 | <0.1/0 | <0.1/0 |
| Comp. Ex. 19 (Cu$_2$O) | | <0.1/0 | <0.1/0 | <0.1/0 | <0.1/0 | <0.1/0 |
| Comp. Ex. 20 (butylal resin) | | <0.1/5 | <0.1/15 | <0.1/100 | <0.1/100 | <0.1/100 |
| Comp. Ex. 21 (xylene) | | <0.1/5 | <0.1/15 | <0.1/30 | <0.1/100 | <0.1/100 |
| Comp. Ex. 22 (ethylbenzene) | | <0.1/5 | <0.1/15 | <0.1/70 | <0.1/100 | <0.1/100 |
| Comp. Ex. 23 (vinylcyclohexane) | | <0.1/5 | <0.1/15 | <0.1/100 | <0.1/100 | <0.1/100 |
| Comp. Ex. 24 (ethylcyclohexane) | | <0.1/5 | <0.1/15 | <0.1/30 | <0.1/100 | <0.1/100 |
| Comp. Ex. 25 (glass plate) | | <0.1/0 | <0.1/5 | <0.1/30 | <0.1/100 | <0.1/100 |
| Comp. Ex. 26 (acrylic plate) | | <0.1/5 | <0.1/10 | <0.1/70 | <0.1/100 | <0.1/100 | thickness of slime layer(bio-jelly) (mm)/settlement of fouling organisms (area %)

TABLE 9-continued

| | bio-jelly producing agent | inhibition zone (mm) |
|---|---|---|
| Ex. 91 | methylcinnamate | 7 |
| Ex. 92 | butylcinnamate | 7 |
| Ex. 93 | n-propylcinnamate | 7 |
| Ex. 94 | i-propylcinnamate | 7 |
| Ex. 95 | hexylcinnamate | 7 |
| Ex. 96 | 2-ethylhexylcinnamate | 7 |
| Ex. 97 | n-octylcinnamate | 7 |
| Ex. 98 | nonylcinnamate | 7 |
| Ex. 99 | laurylcinnamate | 7 |
| Ex. 100 | styrene | 7 |
| Ex. 101 | divinylbenzene | 7 |
| Ex. 102 | α-methylstyrene | 7 |
| Ex. 103 | chlorostyrene | 7 |
| Ex. 104 | chloroethylstyrene | 7 |
| Ex. 105 | trimethoxysilylstyrene | 7 |
| Ex. 106 | triethoxysilyistyrene | 7 |
| Comp. Ex. 27 (TBTO) | | 15 |
| Comp. Ex. 28 ($Cu_2O$) | | 12 |
| Comp. Ex. 29 (xylene) | | 7 |
| Comp. Ex. 30 (ethylbenzene) | | 7 |
| Comp. Ex. 31 (vinylcylohexane) | | 7 |
| Comp. Ex. 32 (ethylcyclohexane) | | 7 |
| Comp. Ex. 33 (control (disk)) | | 7 |

Preparation of Binder Resin

Preparation of binder resin A:

Into a four-necked flask equipped with a stirrer, reflux condenser and dropping funnel, 69 parts by weight of xylene and 9 parts by weight of n-butanol were charged, and the mixture was kept at 110°–120° C. Into the vessel, a mixture of 67 parts by weight of styrene, 21 parts by weight of 2-ethylhexylacrylate, 12 parts by weight of 2-hydroxyethyl methacrylate and 2 parts by weight of azo-bis-isobutyronitryl were added dropwise over 3 hours at uniform rate and then the temperature was kept 2 more hours. Then, varnish A, in which solid content of the resin is 53.0%, and number-average molecular weight of the resin is 9900, was obtained. (Tg=40° C., OH value=50 mgkoh/g; wherein the Tg was determined according to JIS K7121-1987)

Preparation of binder resin B:

Into a four necked flask equipped with a stirrer, reflux condenser and dropping funnel, 69 parts by weight of xylene and 8 parts by weight of n-butanol were charged, and the mixture was kept at 110°–120° C. Into the vessel, a mixture of 45 parts by weight of 2-ethylhexyl methacrylate, 30 parts by weight of styrene, 6 parts by weight of 2-ethylhexyl acrylate, 16 parts by weight of 2-hydroxyethyl methacrylate, 3 parts by weight of methacrylic acid and 2 parts by weight of azo-bis-isobutyronitryl was added dropwise over 3 hours at uniform rate and then the temperature was kept 2 more hours. Then, varnish B, in which solid content of the resin is 56.0%, and number-average molecular weight of the resin is 8600, was obtained. (Tg=25° C., OH value=70 mgkoh/g; wherein the Tg was determined according to JIS K7121-1987)

Preparation of binder resin C—N

Similar to the procedure for preparing the binder resin B, binder resin C—N listed in table 10 were synthesized.

Examples 107–148

An antifouling paint composition of the present invention were prepared according to the formulations listed intables 11–14, using above obtained varnishes.

Comparative examples 34–41

A paint composition containing no bio-jelly producing agent was prepared with components listed in table 15.

TABLE 10

| | varnish | | | | | | | | | | | |
|---|---|---|---|---|---|---|---|---|---|---|---|---|
| | C | D | E | F | G | H | I | J | K | L | M | N |
| styrene | 53.68 | 27.51 | 68.27 | 33.08 | 33.92 | 6.91 | 76.80 | 40.67 | 13.86 | 41.95 | 15.32 | 30.45 |
| methylmethacrylate | 16.02 | 27.41 | | 62.64 | 48.45 | 75.04 | | 10.28 | 36.59 | 25.55 | | |
| 2-ethylhexylacrylate | 30.31 | 27.84 | | | 1.39 | 1.81 | | | 16.24 | 16.23 | | |
| n-butylacrylate | | | | | | | | | | | 20.18 | |
| 2-hydroxyethylmethacrylate | | 16.24 | 4.6 | 4.6 | 16.24 | 16.24 | 23.20 | 16.24 | 16.24 | 16.24 | | |
| laurylmethacrylate | | | 27.13 | | | | | | | | | |
| n-butylmethacrylate | | | | | | | | | | | 64.50 | |
| butylacrylate | | | | | | | | 32.82 | 33.31 | | | |
| N-tertbutylmethacrylamide | | | | | | | | | | | | 69.55 |
| Tg | 23 | 27 | 28 | 88 | 92 | 89 | 93 | 22 | 23 | 48 | 11 | 132 |
| OHV | 0 | 70 | 20 | 20 | 70 | 70 | 100 | 70 | 70 | 70 | 0 | 0 |

TABLE 11

| | Example | | | | | | | | | |
|---|---|---|---|---|---|---|---|---|---|---|
| | 107 | 108 | 109 | 110 | 111 | 112 | 113 | 114 | 115 | 116 |
| varnish A | 50 | 50 | 50 | 50 | 45 | 45 | 40 | 40 | 40 | 40 |
| varnish B | | | | | | | | | | |
| benzylideneaniline | 7.5 | | | | | | | | | |
| benzylidene-4-chloroaniline | | 7.5 | | | | | | | | |
| 2'-hydroxybenzylideneaniline | | | 12.5 | | | | | | | |
| cinnamic acid | | | | 12.5 | | | | | | |
| methylcinnamate | | | | | 22.5 | | | | | |
| α-methylstyrene | | | | | | 22.5 | | | | |
| pottasiumcinnamate | | | | | | | 30 | | | |
| trimethoxysilylstyrene | | | | | | | | 30 | | |
| 4'-ethylbenzylidene-4-aniline | | | | | | | | | | 34 |

TABLE 11-continued

| | Example | | | | | | | | | |
|---|---|---|---|---|---|---|---|---|---|---|
| | 107 | 108 | 109 | 110 | 111 | 112 | 113 | 114 | 115 | 116 |
| p-aminocinnamate | | | | | | | | | | 34 |
| titanium oxide | 20 | 20 | 20 | 20 | 20 | 20 | 15 | 15 | 15 | 15 |
| indian red | 5 | 5 | 5 | 5 | 5 | 5 | | | | |
| colloidal silica | 1.5 | 1.5 | 1.5 | 1.5 | 1.5 | 1.5 | 1.5 | 1.5 | 1.5 | 1.5 |
| xylene | 16 | 16 | 11 | 11 | 6 | 6 | 13.5 | 13.5 | 9.5 | 9.5 |
| film consumption (μm) | 6 | 5 | 10 | 25 | 18 | 16 | 8 | 4 | 7 | 9 |

TABLE 12

| | Example | | | | | | | | | |
|---|---|---|---|---|---|---|---|---|---|---|
| | 117 | 118 | 119 | 120 | 121 | 122 | 123 | 124 | 125 | 126 |
| varnish A | | | | | | | | | | |
| varnish B | 50 | 50 | 50 | 50 | 55 | 45 | 40 | 40 | 40 | 40 |
| benzylideneaniline | | | | | | | | | | 34 |
| benzylidene-4-chloroaniline | | | | | | | | | 34 | |
| 2'-hydroxybenzylideneaniline | | | | | | | | 30 | | |
| cinnamic acid | | | | | | | 30 | | | |
| methylcinnamate | | | | | | 22.5 | | | | |
| α-methylstyrene | | | | | 12.5 | | | | | |
| pottasiumcinnamate | | | | 12.5 | | | | | | |
| trimethoxysilylstyrene | | | 12.5 | | | | | | | |
| 4'-ethylbenzylidene-4-aniline | | 7.5 | | | | | | | | |
| p-aminocinnamate | 7.5 | | | | | | | | | |
| titanium oxide | 20 | 20 | 20 | 20 | 10 | 20 | 15 | 15 | 15 | 15 |
| indian red | 5 | 5 | 5 | 5 | 5 | 5 | | | | |
| colloidal silica | 1.5 | 1.5 | 1.5 | 1.5 | 1.5 | 1.5 | 1.5 | 1.5 | 1.5 | 1.5 |
| xylene | 16 | 16 | 11 | 11 | 6 | 6 | 13.5 | 13.5 | 9.5 | 9.5 |
| film consumption (μm) | 5 | 3 | 3 | 6 | 4 | 22 | 37 | 28 | 12 | 15 |

TABLE 13

| Example | 127 | 128 | 129 | 130 | 131 | 132 | 133 | 134 | 135 | 136 | 137 |
|---|---|---|---|---|---|---|---|---|---|---|---|
| varnish C | 35 | 40 | | | | | | | | | |
| varnish D | | | 35 | | | | | | | | |
| varnish E | | | | | 50 | | 45 | | | | 45 |
| varnish F | | | | | | 45 | | | | | |
| varnish G | | | | | | | | 50 | 50 | | |
| varnish H | | | | | | | | | | 50 | |
| varnish I | | | | | | | | | 45 | | |
| varnish J | | | | | | | | | | | |
| varnish K | | | | | | | | | | | |
| varnish L | | | | | | | | | | | |
| 4'-ethylhexylbenzylideneaniline | | 15 | | | | | | | | | |
| 4'4-oleyloxybenzylideneaniline | | | | | | | 35 | | | | |
| 2'-ethoxy-4'-bromobenzylideneaniline | | | 20 | | | | | | | | |
| 4'-ethoxybenzylidene-4-n-octylaniline | | | | | | 30 | | | | | |
| 2'-butoxybenzylidene-2-ethylaniline | | | | 15 | | | | | | | |
| 4'-naphthyloxybenzylideneaniline | 10 | | | | | | | | | | |
| 4'-ethylbenzylidene-4-nitroaniline | | | | | | | | 25 | | | |
| 3',4'-diethylbenzylidene-4-butylaniline | | | | | 30 | | | | | | |
| telephtalidene-di-4-butoxyaniline | | | | | | | | 15 | | | |
| di-4-butoxybenzylidene-p-phenylenediamine | | | | | | | | | | | |
| benzylidene-4-n-octylaniline | | | | | | | | | | 20 | |
| 4'-nonylbenzylidene-4-methoxyaniline | | | | | | | | | | | |
| 2'-isopropylbenzylidene-4-butoxyaniline | | | | | | | | | 15 | | |
| 4-nonylbenzylideneaniline | | | | | | | | | | | |
| 4'-stearylbenzylidene-4-butoxyaniline | | | | | | | | | | | |
| benzylidene-4-nonyloxyaniline | | | | | | | | | | | |
| 4'-ethylbenzylidene-4-hexylaniline | | | | | | | | | | | |
| ethylcinnamate | | | | | | | | | | | |
| butylcinnamate | | | | | | | | | | | 20 |
| n-propylcinnamate | | | | | | | | | | | |
| i-propylcinnamate | | | | | | | | | | | |
| hexylcinnamate | | | | | | | | | | | |
| 2-ethylhexylcinnamate | | | | | | | | | | | |
| n-octylcinnamate | | | | | | | | | 5 | | |
| nonylcinnamate | | | | | | | 7 | | | | |
| laurylcinnamate | | | | | | | | | | | |

TABLE 13-continued

| Example | 127 | 128 | 129 | 130 | 131 | 132 | 133 | 134 | 135 | 136 | 137 |
|---|---|---|---|---|---|---|---|---|---|---|---|
| aluminiumcinnamate | | | | | | | | | | | |
| styrene | | | | | | | | | | | |
| divinylbenzene | | | | | | | | | | | |
| cinnamic alcohol | | | | | | | | | | | |
| cinnamic aldehyde | | | 5 | | | | | | | | |
| chlorostyrene | | | | | | | | | | | |
| chloroethylstyrene | | | | | | | | | | | |
| triethoxysilylstyrene | | | | | | | | | | | |
| 2,4,5,6-tetrachloroisophtalonitryl | | | | | | | | | | | |
| N,N-dimethyldichlorophenylurea | | | | | | | | | | | |
| 4,5-dichloro-2-octyl-3(2H)isothiazolone | | | | | | | | | | | |
| N-(fluorodichloromethylthio)phtalimido | | | | | | | | | | | |
| 2,4,6-trychlorophenylmaleimide | | | | | | | | | | | |
| tetrachloro-4-(methylsulfonyl)pyridine | | | | | | | | | | | |
| 3-iodide-2-propylbutylcarbamate | | | | | | | | | | | |
| methylparatrylsulfondiiodide | | | | | | | | | | | |
| nonylphenol | | | | | | | | | | | |
| cetylpyridiniumchloride | | | | | | | | 2 | | | |
| benzylpyridiniubromide | | | | | 3 | | | | | | |
| 2-(4-thiazoryl)-benzimidazole | | | | | | | | | | | |
| titanium oxide | 10 | 5 | 10 | | | | 10 | 5 | 15 | | 10 |
| indian red | 5 | 10 | 15 | | | | | | 5 | 5 | 10 |
| colloidal silica | 5 | 5 | 5 | 5 | 5 | 5 | 5 | 3 | 5 | 5 | 5 |
| xylene | 15 | 15 | 10 | 10 | 5 | 10 | 5 | 10 | | 15 | 5 |
| n-butanol | 5 | 5 | 5 | 5 | 5 | 5 | 5 | 5 | 5 | 5 | 5 |

TABLE 14

| Example | 138 | 139 | 140 | 141 | 142 | 143 | 144 | 145 | 146 | 147 | 148 |
|---|---|---|---|---|---|---|---|---|---|---|---|
| varnish C | | | | | | | | | | | 45 |
| varnish D | | | | | | | 55 | | | | |
| varnish E | | | | | | | | | | | |
| varnish F | | | | | | 45 | | | | | |
| varnish G | | | | | | | | 45 | | | |
| varnish H | | | | | | | | | | | |
| varnish I | | 55 | | | | | | | 40 | | |
| varnish J | | | 40 | 55 | | | | | | 35 | |
| varnish K | | | | | 35 | | | | | | |
| varnish L | 35 | | | | | | | | | | |
| 4'-ethylhexylbenzylideneaniline | | | | | | | | | | | |
| 4'4-oleyloxybenzylideneaniline | | | | | | | | | 10 | | |
| 2-ethoxy-4'-bromobenzylideneaniline | | | | | | | | | | | |
| 4'-ethoxybenzylidene-4-n-octylaniline | | | | | | | | | | | |
| 2'-butoxybenzylidene-2-ethylaniline | | | | | | | | | | | |
| 4'-naphthyloxybenzylideneaniline | | | | | | | | | | | |
| 4'-ethylbenzylidene-4-nitroaniline | | | | | | | | | | | |
| 3',4'-diethylbenzylidene-4-butylaniline | | | | | | | | | | | |
| telephtalidene-di-4-butoxyaniline | | | | | | | | | | | |
| di-4-butoxybenzylidene-p-phenylenediamine | 15 | | | | | | | | | | |
| benzylidene-4-n-octylaniline | | | | | | | | | | | |
| 4'-nonylbenzylidene-4-methoxyaniline | | | | 10 | | | | | | | |
| 2'-isopropylbenzylidene-4-butoxyaniline | | | | | | | | | | | |
| 4-nonylbenzylideneaniline | | | | 15 | | | | | | | |
| 4'-stearylbenzylidene-4-butoxyaniline | | | 25 | | | | | | | | |
| benzylidene-4-nonyloxyaniline | | | | | 10 | | | | | | |
| 4'-ethylbenzylidene-4-hexylaniline | | | | | | | 5 | | | | |
| ethylcinnamate | 10 | | | | | | | | | | |
| butylcinnamate | | | | | | | | | | | |
| n-propylcinnamate | | | | 10 | | | | | | | |
| i-propylcinnamate | | | | | | 10 | | | 10 | | |
| hexylcinnamate | | | | | | | | | | 10 | |
| 2-ethylhexylcinnamate | | | | | | | 10 | | | | |
| n-octylcinnamate | | | | | | | | | 5 | | |
| nonylcinnamate | | | 10 | | | | | | | | |
| laurylcinnamate | | | | | | | | 5 | | | |
| aluminiumcinnamate | | | | | | | 5 | | | | |
| styrene | | | | | 15 | | | | | | |
| divinylbenzene | | | | | | | | | 15 | | |
| cinnamic alcohol | | | | | | | | 15 | | | 20 |
| cinnamic aldehyde | | | 5 | | | | | | | | |
| chlorostyrene | | | 5 | | | | | | | | |
| chloroethylstyrene | | | | | 5 | | | | | | 10 |
| triethoxysilylstyrene | | | | | | | | 10 | | | |

TABLE 14-continued

| Example | 138 | 139 | 140 | 141 | 142 | 143 | 144 | 145 | 146 | 147 | 148 |
|---|---|---|---|---|---|---|---|---|---|---|---|
| 2,4,5,6-tetrachloroisophtalonitryl | | | | | | | | 5 | | | |
| N,N-dimethyldichlorophenylurea | | | | | | | | | | 2 | |
| 4,5-dichloro-2-octyl-3(2H)isothiazolone | | | | | | | 3 | | | | |
| N-(fluorodichloromethylthio)phtalimido | | | | | | | | | | 3 | |
| 2,4,6-trychlorophenylmaleimide | | | | | | | | | 3 | | |
| tetrachloro-4-(methylsulfonyl)pyridine | | | | | | | 2 | | | | |
| 3-iodide-2-propylbutylcarbamate | | | | | 3 | | | | | | |
| methylparatrylsulfondiiodide | | | | 5 | | | | | | | |
| nonylphenol | 5 | | | | 2 | | | | | | |
| cetylpyridiniumchloride | | | | | | | | | | | 3 |
| benzylpyridiniubromide | | | | | | | | | | | 2 |
| 2-(4-thiazoryl)-benzimidazole | 2 | | | | | | | | | | |
| titanium oxide | 5 | | | 2 | 10 | 15 | | 10 | 15 | 10 | 10 |
| indian red | 5 | | 3 | | 10 | 5 | | 5 | 15 | 10 | |
| colloidal silica | 5 | 5 | 5 | 5 | 5 | 5 | 5 | 5 | 5 | 5 | 5 |
| xylene | 10 | 2 | 13 | 5 | 5 | 5 | 5 | 10 | 2 | 10 | |
| n-butanol | 3 | 3 | 2 | 5 | 5 | 5 | 5 | 2 | 5 | 5 | 5 |

TABLE 15

| | Comparative Example | | | | | | | |
|---|---|---|---|---|---|---|---|---|
| | 34 | 35 | 36 | 37 | 38 | 39 | 40 | 41 |
| varnish A | 50 | 45 | 40 | 50 | | | | |
| varnish B | | | | | 40 | 50 | | |
| varnish M | | | | | | | 50 | |
| varnish N | | | | | | | | 45 |
| ethylbenzene | 7.5 | | | | 34 | | | |
| vinylcyclohexane | | 22.5 | | | | | | |
| ethylcyclohexane | | | 30 | | | | | |
| benzylideneaniline | | | | | | | 20 | 25 |
| titanium oxide | 20 | 20 | 15 | 20 | 15 | 20 | 10 | 10 |
| indian red | 5 | 5 | | 5 | | 5 | 10 | 5 |
| colloidal silica | 1.5 | 1.5 | 1.5 | 1.5 | 1.5 | 1.5 | 3 | 3 |
| xylene | 16 | 16 | 13.5 | 23.5 | 9.5 | 23.5 | | 5 |
| n-butanol | | | | | | | 7 | 7 |

The antifouling paint composition prepared as above was applied on surface of an acrylic plate (300 mm×100 mm×2 mm) and dried so that the thickness of the paint film was about 200 μm. The plate was putted into 1 m depth of sea at the temperature of 12°–18° C., and observed of amount of settled animals such as barnacles and tubeworms, and plants such as algae and green algae by naked eyes and evaluated by % of settled area. The results are shown in table 16.

TABLE 16

| | settlement prevention | | | | |
|---|---|---|---|---|---|
| | 2 weeks | 1 month | 2 months | 4 months | 6 months |
| Ex. 107 | 0/1 | 0/2 | 0/3 | 0/3 | 0/3 |
| Ex. 108 | 0/2 | 0/2 | 0/2 | 0/2 | 0/2 |
| Ex. 109 | 0/2 | 0/3 | 0/2 | 0/2 | 0/3 |
| Ex. 110 | 0/1 | 0/1 | 0/1 | 0/2 | 0/2 |
| Ex. 111 | 0/2 | 0/2 | 0/2 | 0/2 | 0/3 |
| Ex. 112 | 0/1 | 0/1 | 0/2 | 0/2 | 0/3 |
| Ex. 113 | 0/2 | 0/2 | 0/2 | 0/2 | 0/2 |
| Ex. 114 | 0/1 | 0/2 | 0/1 | 0/2 | 0/3 |
| Ex. 115 | 0/1 | 0/1 | 0/1 | 0/2 | 0/2 |
| Ex. 116 | 0/1 | 0/1 | 0/1 | 0/2 | 0/2 |
| Ex. 117 | 0/2 | 0/2 | 0/2 | 0/2 | 0/3 |
| Ex. 118 | 0/1 | 0/2 | 0/1 | 0/2 | 0/3 |
| Ex. 119 | 0/2 | 0/2 | 0/3 | 0/2 | 0/2 |
| Ex. 120 | 0/2 | 0/2 | 0/2 | 0/2 | 0/3 |
| Ex. 121 | 0/1 | 0/1 | 0/3 | 0/3 | 0/2 |
| Ex. 122 | 0/2 | 0/2 | 0/2 | 0/2 | 0/2 |
| Ex. 123 | 0/1 | 0/1 | 0/2 | 0/2 | 0/2 |
| Ex. 124 | 0/2 | 0/2 | 0/2 | 0/2 | 0/3 |
| Ex. 125 | 0/2 | 0/2 | 0/2 | 0/2 | 0/3 |
| Ex. 126 | 0/1 | 0/3 | 0/2 | 0/2 | 0/2 |
| Ex. 127 | 0/2 | 0/3 | 0/3 | 0/2 | 0/3 |
| Ex. 128 | 0/2 | 0/3 | 0/3 | 0/3 | 0/2 |
| Ex. 129 | 0/2 | 0/2 | 0/2 | 0/2 | 0/2 |
| Ex. 130 | 0/1 | 0/1 | 0/1 | 0/3 | 0/3 |
| Ex. 131 | 0/2 | 0/3 | 0/2 | 0/2 | 0/3 |
| Ex. 132 | 0/1 | 0/1 | 0/1 | 0/2 | 0/3 |
| Ex. 133 | 0/2 | 0/1 | 0/2 | 0/2 | 0/3 |
| Ex. 134 | 0/2 | 0/2 | 0/2 | 0/3 | 0/3 |
| Ex. 135 | 0/2 | 0/1 | 0/2 | 0/2 | 0/3 |
| Ex. 136 | 0/1 | 0/3 | 0/1 | 0/2 | 0/2 |
| Ex. 137 | 0/2 | 0/2 | 0/2 | 0/2 | 0/3 |
| Ex. 138 | 0/1 | 0/1 | 0/1 | 0/2 | 0/2 |
| Ex. 139 | 0/2 | 0/2 | 0/2 | 0/2 | 0/2 |
| Ex. 140 | 0/2 | 0/2 | 0/3 | 0/2 | 0/2 |
| Ex. 141 | 0/2 | 0/1 | 0/2 | 0/2 | 0/2 |
| Ex. 142 | 0/2 | 0/2 | 0/3 | 0/2 | 0/3 |
| Ex. 143 | 0/1 | 0/1 | 0/1 | 0/2 | 0/2 |
| Ex. 144 | 0/2 | 0/3 | 0/2 | 0/2 | 0/3 |
| Ex. 145 | 0/1 | 0/2 | 0/2 | 0/2 | 0/2 |
| Ex. 146 | 0/1 | 0/1 | 0/2 | 0/2 | 0/3 |
| Ex. 147 | 0/1 | 0/2 | 0/1 | 0/3 | 0/3 |
| Ex. 148 | 0/2 | 0/3 | 0/2 | 0/2 | 0/3 |
| Comp. Ex. 34 | 5/0.1> | 15/0.1> | 40/0.1> | 100/0.1> | 100/0.1> |
| Comp. Ex. 35 | 5/0.1> | 15/0.1> | 40/0.1> | 100/0.1> | 100/0.1> |
| Comp. Ex. 36 | 5/0.1> | 15/0.1> | 60/0.1> | 100/0.1> | 100/0.1> |
| Comp. Ex. 37 | 10/0.1> | 20/0.1> | 75/0.1> | 100/0.1> | 100/0.1> |
| Comp. Ex. 38 | 5/0.1> | 15/0.1> | 65/0.1> | 100/0.1> | 100/0.1> |
| Comp. Ex. 39 | 10/0.1> | 20/0.1> | 70/0.1> | 100/0.1> | 100/0.1> |
| Comp. Ex. 40 | 0/1 | 0/2 | paint was peeling off. | | |
| Comp. Ex. 41 | 0/0.2 | 5/0.17 | 30/0.17 | 100/0.17 | 100/0.17 | settlement of fouling organisms (area %)/thickness of slime layer (bio-jelly) (mm)

Examples 149–178

An antifouling paint composition was prepared by mixing 20 g of butyral resin (BM-2:SEKISUI KAGAKU), 10 g of antifouling compound listed in table 16, 10 g of xylene and 5 g of n-butanol.

Comparative example 42

An antifouling paint composition was prepared by mixing 20 g of butyral resin, 7 g of TBTO, 10 g of xylene and 5 g of n-butanol.

Comparative example 43

An antifouling paint composition similar to comparative example 42 with the exception of using 15 g of cuprous oxide and 5 g of rosin instead of TBTO was prepared.

Comparative example 44

A paint composition was prepared by dissolving 20 g of butyral resin into 15 g of methylethylketone.

Evaluation

The respective compositions prepared in examples 149–178 and comparative examples 42–44 was applied on surface of an acrylic plate (300 mm×100 mm×2 mm) and dried to obtain a paint film about 200 $\mu$m thickness. The plate was soaked into 1 m depth of sea at the temperature of 12°–18° C. After 1, 2, 4, 8, and 12 months, settled animals such as barnacles and tubeworms, and plants such as algae and green algae, on the surface of the plate were observed with naked eyes. Antifouling effect was determined by % of the settled area. The results are shown in table 15.

TABLE 17

| | | settlement prevention | | | | |
|---|---|---|---|---|---|---|
| Example | antifouling agent | 1 month | 2 months | 4 months | 8 months | 12 months |
| 149 | 2-methylpyridine | 0 | 0 | 0 | 0 | 5 |
| 150 | 4-ethylpyridine | 0 | 0 | 0 | 0 | 5 |
| 151 | 4-hexylpyridine | 0 | 0 | 0 | 0 | 0 |
| 152 | octylpyridine | 0 | 0 | 0 | 0 | 0 |
| 153 | 4-nonylpyridine | 0 | 0 | 0 | 0 | 0 |
| 154 | 4-decylpyridine | 0 | 0 | 0 | 0 | 0 |
| 155 | 4-laurylpyridine | 0 | 0 | 0 | 0 | 0 |
| 156 | aniline | 0 | 0 | 0 | 0 | 2 |
| 157 | 4-ethylaniline | 0 | 0 | 0 | 0 | 5 |
| 158 | 4-hexylaniline | 0 | 0 | 0 | 0 | 0 |
| 159 | 4-octylaniline | 0 | 0 | 0 | 0 | 0 |
| 160 | 4-nonylaniline | 0 | 0 | 0 | 0 | 0 |
| 161 | 4-decylaniline | 0 | 0 | 0 | 0 | 0 |
| 162 | 4-dodecylaniline | 0 | 0 | 0 | 0 | 0 |
| 163 | 4-ethylnitrobenzene | 0 | 0 | 0 | 0 | 5 |
| 164 | 4-octylbenzenesulfonic acid | 0 | 0 | 0 | 0 | 0 |
| 165 | 4-ethylbenzenesulfonic acid | 0 | 0 | 0 | 2 | 5 |
| 166 | 4-hexylnitrobenzene | 0 | 0 | 0 | 0 | 0 |
| 167 | 4-octylbenzaldehyde | 0 | 0 | 0 | 0 | 0 |
| 168 | 4-nonylbenzaldehyde | 0 | 0 | 0 | 0 | 0 |
| 169 | 4-ethylbenzenesulfon | 0 | 0 | 0 | 0 | 5 |
| 170 | 4-octylbenzoic acid | 0 | 0 | 0 | 0 | 0 |
| 171 | 4-hexyloxyaniline | 0 | 0 | 0 | 0 | 0 |
| 172 | 4-nonyloxypyridine | 0 | 0 | 0 | 0 | 0 |
| 173 | 4-hexyl-2-chloroaniline | 0 | 0 | 0 | 0 | 0 |
| 174 | 4-ethoxy-2-chloroaniline | 0 | 0 | 0 | 0 | 5 |
| 175 | 4-nonyloxyaniline | 0 | 0 | 0 | 0 | 0 |
| 176 | 4-decylbenzoic acid | 0 | 0 | 0 | 0 | 0 |
| 177 | 4-oleylaniline | 0 | 0 | 0 | 2 | 6 |
| 178 | 4-stearylaniline | 0 | 0 | 0 | 0 | 5 |
| comparative example 42 (TBTO) | | 0 | 0 | 0 | 0 | 0 |
| comparative example 43 (Cu$_2$O) | | 0 | 0 | 0 | 0 | 0 |
| comparative example 44 | | 15 | 50 | 100 | 100 | 100 |

Examples 179–196 and Comparative examples 45, 46

A paint composition was prepared by mixing componentslisted in table 18 (for examples 179–187), table 19 (for examples 188–196) and table 20(comparative examples 45–46).

TABLE 18

(g)

| Example | 179 | 180 | 181 | 182 | 183 | 184 | 185 | 186 | 187 |
|---|---|---|---|---|---|---|---|---|---|
| acrylic resin A[1] | 25 | | | | | | | | |
| acrylic resin B[2] | | 30 | | | 30 | | | | |
| NT-100[3] | | | 55 | | | | | 45 | 45 |
| rubber chloride[4] | | | | 30 | | 30 | 25 | | |
| 4-octylaniline | 15 | | | | | | | | |
| 4-nonylaniline | | 25 | | | | | | | |
| 4-dodecylaniline | | | 15 | | | | | | |
| 4-nonyloxyaniline | | | | | 20 | | | | |
| 4-decylbenzoic acid | | | | 5 | 20 | | | | |
| 4-octylpyridine | | | | | | 20 | | | |
| 4-nonylpyridine | | | | | | | 20 | | |
| 4-decylpyridine | | | | | | | | 15 | |
| 4-hexylnitrobenzene | | | | | | | | | 20 |
| aniline | | | | | | | | | |
| 4-octylbenzaldehyde | | | | | | | | | |
| 4-nonylbenzaldehyde | | | | | | | | | |
| 2-octylbenzoic acid | | | | | | | | | |
| W/W rosin | | | | 5 | | 5 | 7 | | 10 |
| titanium oxide | 10 | | | 10 | 10 | 5 | 10 | | 10 |
| indian red | 5 | 5 | 5 | | 10 | 10 | | 5 | 5 |
| talc | | 5 | | | | | | 10 | |
| colloidal silica | 3 | 3 | 3 | 3 | 3 | 3 | 3 | 3 | 3 |
| xylene | 35 | 27 | 15 | 27 | 25 | 22 | 30 | 17 | 12 |
| butynol | 7 | 5 | 2 | 5 | 2 | 5 | 5 | 5 | 5 |

[1] acrylic resin A: methylmethacrylate/n-butylacrylate/2-hydroxyethyl methacrylate = 50/35/15(wt %), Mn = 30000
[2] acrylic resin B: methylmethacrylate/styrene/ethylacrylate/2-hydroxyethyl methacrylate = 50/10/30/10 (wt %), Mn = 25000
[3] NT-100: purchased from NITTO KASEI
[4] rubber chloride: RAROFLEX MP-45, purchased from BASF

TABLE 19

(g)

| Example | 188 | 189 | 190 | 191 | 192 | 193 | 194 | 195 | 196 |
|---|---|---|---|---|---|---|---|---|---|
| acrylic resin A[1] | | | | | | | 25 | | |
| acrylic resin B[2] | 35 | 35 | | 35 | | | 25 | | |
| NT-100[3] | | | | | | | | 20 | |
| rubber chloride[4] | | | 25 | | 15 | | | | 15 |
| 4-octylaniline | | | | | | 30 | | | |
| 4-nonylaniline | 15 | 15 | | 5 | | | | | |
| 4-dodecylaniline | | | | | | | | | |
| 4-nonyloxyaniline | 15 | | | | | | | | |
| 4-decylbenzoic acid | | | | | | | | | |
| 4-octylpyridine | | | | 15 | | | | | |
| 4-nonylpyridine | | | | | | | | | |
| 4-decylpyridine | | | | | 10 | | | | |
| 4-hexylnitrobenzene | | | | | 5 | | | | |
| aniline | | 10 | | | | | 5 | | |
| 4-octylbenzaldehyde | | | | | | | 15 | | |
| 4-nonylbenzaldehyde | | | | | | | | 20 | |
| 2-octylbenzoic acid | | | | | | | | | 20 |
| W/W rosin | | | 7 | | 15 | | | 15 | 15 |
| titanium oxide | 5 | 5 | 15 | 25 | 15 | 10 | 20 | 5 | 15 |
| indian red | 5 | 5 | 10 | 5 | 5 | 5 | 5 | 5 | 5 |
| talc | | | 5 | 5 | | | 5 | | 5 |
| colloidal silica | 3 | 3 | 3 | 3 | 3 | 3 | 3 | 3 | 3 |
| xylene | 17 | 22 | 20 | 17 | 27 | 17 | 17 | 27 | 17 |
| butynol | 5 | 5 | 5 | 5 | 5 | 5 | 5 | 5 | 5 |

[1] acrylic resin A: methylmethacrylate/n-butylacrylate/2-hydroxyethyl methacrylate = 50/35/15(wt %), Mn = 30000
[2] acrylic resin B: methylmethacrylate/styrene/ethylacrylate/2-hydroxyethyl methacrylate = 50/10/30/10 (wt %), Mn = 25000
[3] NT-100: purchased from NITTO KASEI
[4] rubber chloride: RAROFLEX MP-45, purchased from BASF

TABLE 20

| Comparative Example | 45 | 46 |
|---|---|---|
| Cu$_2$O | 20 | |
| rubber chloride | 20 | 20 |
| w/w rosin | 10 | 10 |
| titanium oxide | 15 | 15 |
| indian red | 5 | 20 |
| talc | | 5 |
| colloidal silica | 3 | 3 |
| xylene | 22 | 22 |
| butanol | 5 | 5 |

Evaluation

The respective compositions prepared in examples 179–196 and comparative examples 45–46 was applied on surface of acrylic plate (300 mm×100 mm×2 mm) and dried so that the thickness of the paint film is about 200 μm. The plate was soaked into 1 m depth of sea at the temperature of 12°–18° C. After 1, 2, 4, 8, and 12 months, settled animals such as barnacles and tubeworms, and plants such as algae and green algae, on the surface of the plate were observed with naked eyes. Antifouling effect was determined by % of the settled area. The results are shown in table 21.

TABLE 21

| | antifouling effect | | | | | | |
|---|---|---|---|---|---|---|---|
| | 1 month | 2 months | 4 months | 8 months | 12 months | 16 months | 20 months |
| Ex. 179 | 0 | 0 | 0 | 0 | 0 | 0 | 0 |
| Ex. 180 | 0 | 0 | 0 | 0 | 0 | 0 | 0 |
| Ex. 181 | 0 | 0 | 0 | 0 | 0 | 0 | 0 |
| Ex. 182 | 0 | 0 | 0 | 0 | 0 | 0 | 0 |
| Ex. 183 | 0 | 0 | 0 | 0 | 0 | 0 | 0 |
| Ex. 184 | 0 | 0 | 0 | 0 | 0 | 0 | 0 |
| Ex. 185 | 0 | 0 | 0 | 0 | 0 | 0 | 0 |
| Ex. 186 | 0 | 0 | 0 | 0 | 0 | 0 | 0 |
| Ex. 187 | 0 | 0 | 0 | 0 | 0 | 0 | 0 |
| Ex. 188 | 0 | 0 | 0 | 0 | 0 | 0 | 0 |
| Ex. 189 | 0 | 0 | 0 | 0 | 0 | 0 | 0 |
| Ex. 190 | 0 | 0 | 0 | 0 | 0 | 0 | 0 |
| Ex. 191 | 0 | 0 | 0 | 0 | 0 | 0 | 5 |
| Ex. 192 | 0 | 0 | 0 | 0 | 0 | 0 | 0 |
| Ex. 193 | 0 | 0 | 0 | 0 | 0 | 0 | 0 |
| Ex. 194 | 0 | 0 | 0 | 0 | 0 | 0 | 0 |
| Ex. 195 | 0 | 0 | 0 | 0 | 0 | 0 | 0 |
| Ex. 196 | 0 | 0 | 0 | 0 | 0 | 0 | 0 |
| Comp. Ex. 45 | 0 | 0 | 0 | 0 | 0 | 0 | 5 |
| Comp. Ex. 46 | 5 | 10 | 50 | 100 | 100 | 100 | 100 |

What is claimed is:

1. A method for producing a bio-jelly on a surface of an aquatic structure in order to reduce settlement of an aquatic fouling organism thereon, which comprises applying an effective amount of a bio-jelly producing agent comprising a compound of the formula:

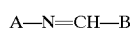

wherein A and B are organic moieties having 3–26 carbon atoms, respectively, on the surface of the aquatic structure to produce the bio-jelly, wherein the thickness of the bio-jelly produced is greater than or equal to 0.3 mm;

provided that when said formula represents a benzylidene aniline derivative of formula (I):

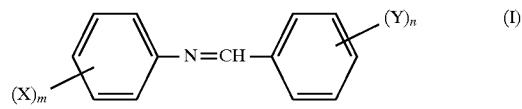

wherein n and m are integers of 0–5 respectively, X may be the same or different and is selected from the group consisting of a halogen, a hydrocarbon or alkoxy having 1–20 carbon atoms, a nitro, an amino, a hydroxyl, a carboxyl, an ester, a cyano, an azo and an azomethine group, Y may be the same or different and is selected from the group consisting of a halogen, a hydrocarbon or alkoxy having 1–20 carbon atoms, a nitro, an amino, a hydroxyl, a carboxyl, an ester, a cyano, an azo and an azomethine group, X is not a chlorine atom or a nitro group when Y is a nitro or hydroxyl group, n is 1 and m is 1 to 5.

2. A method of claim 1, wherein the bio-jelly is produced in a thickness of about 0.3–6 mm on the surface of said aquatic structure.

3. A method of claim 1, wherein the bio-jelly consists essentially of polysaccharides and at least about 60% by weight of the polysaccharides are composed of a neutral monosaccharide unit selected from the group consisting of rhamnose, mannose, arabinose, glucose and a mixture thereof.

4. A method of claim 1, wherein the method comprises a step of painting a bio-jelly producing paint composition comprising the bio-jelly producing agent on said surface.

5. A method of claim 1, wherein the compound is a benzylidene aniline derivative of the formula I:

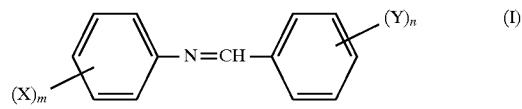

wherein n and m are integers of 0–5 respectively, X may be the same or different and is selected from the group consisting of a halogen, a hydrocarbon or alkoxyl having 1–20 carbon atoms, a nitro, an amino, a hydroxyl, a carboxyl, an ester, a cyano, an azo and an azomethine group, Y may be the same or different and is selected from the group consisting of a halogen, a hydrocarbon or alkoxy having 1–20 carbon atoms, a nitro, an amino, a hydroxyl, a carboxyl, an ester, a cyano, an azo and an azomethine group, provided that X is not a chlorine atom or a nitro group when Y is a nitro or hydroxyl group, n is 1 and m is 1 to 5.

6. A method of claim 5, wherein the benzylidene aniline derivative has the formula II:

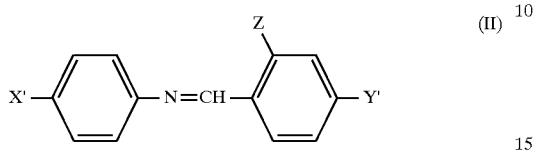

wherein X' is selected from the group consisting of hydrogen, halogen, hydroxyl and nitro; Y' is selected from the group consisting of chloro and methyl; and Z is selected from the group consisting of hydrogen and hydroxyl; and at least two of X', Y' and Z are hydrogen atoms.

7. A method for producing a bio-jelly on a surface of an aquatic structure in order to reduce settlement of an aquatic fouling organism thereon, which comprises applying an effective amount of bio-jelly producing agent comprising a compound having a styryl or a cinnamoyl group of the formula III:

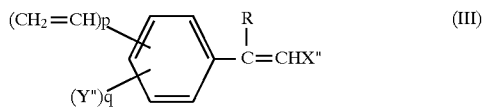

wherein X" is selected from the group consisting of hydrogen, carboxyl, hydroxymethyl, aldehyde, carbonyl and amide, when X" is carboxyl, it may be an ester or a salt thereof; Y" is selected from the group consisting of halogen, alkyl, halogenated alkyl, nitro, alkoxy, carboxyl, ester, cyano, azo, azomethine, amino, alkoxysilyl and alkoxysilylalkyl; R is selected from the group consisting of hydrogen, alkyl and halogen; q is an integer of 0–2 and p is an integer of 0 and 1;

on the surface of the aquatic structure to produce the bio-jelly, wherein the thickness of the bio-jelly produced is greater than or equal to 0.3 mm.

8. A method of claim 7, wherein the compound having a styryl or a cinnamoyl group is selected from the group consisting of cinnamic acid, cinnamic acid ester, cinnamate salt, styrene, divinylbenzene and α-substituted styrene.

9. A method of claim 7, wherein the method comprises a step of painting a bio-jelly producing paintcomposition comprising the bio-jelly producing agent on said surface.

* * * * *